United States Patent
Fodor et al.

(10) Patent No.: US 10,412,745 B2
(45) Date of Patent: Sep. 10, 2019

(54) PEAK-TO-AVERAGE POWER RATIO REDUCTION IN MULTIUSER MIMO SYSTEMS

(71) Applicant: Telefonaktiebolaget LM Ericsson (publ), Stockholm (SE)

(72) Inventors: Gabor Fodor, Hässelby (SE); Robert Baldemair, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 52 days.

(21) Appl. No.: 15/524,150

(22) PCT Filed: Nov. 30, 2016

(86) PCT No.: PCT/SE2016/051185
§ 371 (c)(1),
(2) Date: May 3, 2017

(87) PCT Pub. No.: WO2018/101863
PCT Pub. Date: Jun. 7, 2018

(65) Prior Publication Data
US 2018/0302905 A1    Oct. 18, 2018

(51) Int. Cl.
*H04L 27/26* (2006.01)
*H04W 72/08* (2009.01)
(Continued)

(52) U.S. Cl.
CPC ........... *H04W 72/082* (2013.01); *H04L 5/005* (2013.01); *H04L 5/0023* (2013.01);
(Continued)

(58) Field of Classification Search
CPC ........... H04W 72/0453; H04W 72/042; H04W 72/1215; H04W 16/14; H04W 72/082; H04W 84/12
See application file for complete search history.

(56) References Cited

U.S. PATENT DOCUMENTS 8,238,496 B1    8/2012 Narasimhan et al.
2010/0080154 A1    4/2010 Noh et al.
(Continued)

FOREIGN PATENT DOCUMENTS

EP    2051401 A2    4/2009
JP    2012016007 A    1/2012
WO    2016004634 A1    1/2016

OTHER PUBLICATIONS

Mohsen et al. (Uplink interference alignment for OFDM systems) (Year: 2011).*
(Continued)

*Primary Examiner* — Lakeram Jangbahadur
(74) *Attorney, Agent, or Firm* — Murphy, Bilak & Homiller, PLLC

(57) ABSTRACT

The present disclosure relates to reference signalling in mobile communications, to transmitting and receiving uplink reference signals in a multi-carrier system by adapting the subcarrier frequency spacing of the reference elements used for transmitting the reference signal. The disclosure also relates to corresponding devices and a computer program for executing the proposed methods, and a carrier containing said computer program. The disclosure proposes a method, for use in a wireless device, for transmitting a reference signal. The method comprises receiving information indicating a frequency subcarrier spacing, determining a sequence of a reference signal based on the received information and transmitting the reference signal to a network node. The disclosure also proposes a method, for use in a network node, for receiving a reference signal by obtaining information indicating a frequency subcarrier spacing, transmitting the obtained information to a wireless device and receiving the reference signal from the wireless device.

48 Claims, 9 Drawing Sheets

(51) Int. Cl.
*H04L 5/00* (2006.01)
*H04B 7/0452* (2017.01)
*H04L 25/02* (2006.01)

(52) U.S. Cl.
CPC .......... *H04L 27/261* (2013.01); *H04L 27/262* (2013.01); *H04L 27/2646* (2013.01); *H04B 7/0452* (2013.01); *H04L 25/0228* (2013.01); *H04L 27/2607* (2013.01)

(56) References Cited

U.S. PATENT DOCUMENTS

2010/0118826 A1    5/2010  Chong et al.
2010/0260154 A1*  10/2010  Frank ........................ G01S 5/10
                                                    370/336
2017/0366311 A1*  12/2017  Iyer ...................... H04B 7/0482

OTHER PUBLICATIONS

Unknown, Author, "3rd Generation Partnership Project; Technical Specification Group Radio Access Network; Study on New Radio (NR) Access Technology Physical Layer Aspects (Release 14)", 3GPP TR 38.802 V0.3.0, Oct. 2016, pp. 1-43.
Kheirabadi, Mohsen R., "Uplink Interference Alignment for OFDM Systems", School of ECE, University of Tehran, 2011 18th International Conference on Telecommunications, Tehran, Iran, IEEE, XP031997066, pp. 95-100.
Samsung, "General Design Principles for 5G New Radio Interface; Key Functionalities", 3GPP TSG RAN WG1 #84bis, R1-162172, Samsung, Busan, Korea, Apr. 11-15, 2016, pp. 1-3.

* cited by examiner

PEAK-TO-AVERAGE POWER RATIO REDUCTION IN MULTIUSER MIMO SYSTEMS

TECHNICAL FIELD

The present disclosure relates to reference signalling in mobile communications. More specifically, the proposed technique relates to transmitting and receiving uplink reference signals in a multi-carrier system. The disclosure also relates to corresponding devices and to a computer program for executing the proposed methods, and to a carrier containing said computer program.

BACKGROUND

The fifth generation of mobile telecommunications and wireless technology is not yet fully defined but in an advanced draft stage within 3GPP. 5G wireless access will be realized by the evolution of Long Term Evolution, LTE, for existing spectrum in combination with new radio access technologies that primarily target new spectrum. Due to the scarcity of available spectrum, spectrum located in very high frequency ranges (compared to the frequencies that have so far been used for wireless communication), such as 10 GHz and above, are planned to be utilized for future mobile communication systems. Thus, evolving to 5G includes work on a New Radio (NR) Access Technology (RAT), also known as 5G or next generation (NX). The NR air interface targets spectrum in the range from sub-1 GHz (below 1 GHz) up to 100 GHz with initial deployments expected in frequency bands not utilized by LTE. Some LTE terminology is used in this disclosure in a forward looking sense, to include equivalent 5G entities or functionalities although a different term may be specified in 5G. A general description of the agreements on 5G New Radio (NR) Access Technology so far is contained in 3GPP TR 38.802 V0.3.0 (2016-10), of which a draft version has been published as R1-1610848. Final specifications may be published inter alia in the future 3GPP TS 38.2** series.

Physical resources for RATs used in wireless communication networks may be scheduled in time and frequency in what could be seen as a time and frequency grid. For example, the basic downlink physical resource of the RAT LTE can be seen as a time-frequency grid as illustrated in FIG. 1. LTE uses Orthogonal Frequency Division Multiplexing (OFDM) in the downlink and a pre-coded version of OFDM called Single Carrier Frequency Division Multiple Access (SC-FDMA) in the uplink. LTE uses OFDM to transmit the data over many narrow band carriers, usually of 180 KHz each, instead of spreading one signal over the complete 5 MHz carrier bandwidth, in other words OFDM uses a large number of narrow sub-carriers for multi-carrier transmission to carry data. OFDM is thus a so called multi carrier system. Multi carrier systems are systems that uses multiple sinusoidal waves of predefined frequencies as multiple subcarriers. In multicarrier systems, data are divided on the different subcarriers of one transmitter. The difference between the frequencies of two adjacent subcarriers is called the frequency domain subcarrier spacing or subcarrier spacing for short. The OFDM symbols are grouped into so called physical resource blocks (PRB) or just resource blocks (RB). The basic unit of transmission in LTE is a RB, which in its most common configuration consists of 12 subcarriers and 7 OFDM symbols (one slot). In LTE the resource blocks have a total size of 180 kHz in the frequency domain and 0.5 ms (one slot) in the time domain. Each element in the time-frequency grid containing one symbol and one subcarrier is referred to as a resource element (RE). Each 1 ms Transmission Time Interval (TTI) consists of two slots (Tslot), usually represented by 14 OFDM symbols. LTE downlink transmissions are organized into radio frames of 10 ms, each radio frame consisting of ten equally-sized subframes of length Tsubframe=1 ms, as shown in FIG. 2. The resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

The new RAT NR will use a similar structure for the physical resources as LTE, using multiple carriers in frequency and symbols in the time domain, defining resource elements of physical resource blocks. The physical resource parameters may vary in NR. For example, the carriers may span a variable frequency range, the frequency spacing or density between the carriers may vary, as well as the cyclic prefix (CP) used. The frequency spacing between subcarriers can be seen as the frequency bandwidth between the center of a subcarrier and the adjacent subcarrier, or the bandwidth occupied by each subcarrier in the frequency band.

A numerology defines basic physical layer parameters, such as subframe structure and may include transmission bandwidth, subframe duration, frame duration, slot duration, symbol duration, subcarrier spacing, sampling frequency, number of subcarrier, RB per subframe, symbols per subframe, CP length etc. In LTE the term numerology includes, e.g., the following elements: frame duration, subframe or TTI duration, slot duration, subcarrier spacing, cyclic prefix length, number of subcarriers per RB, number of RBs within the bandwidth (different numerologies may result in different numbers of RBs within the same bandwidth).

The exact values for the numerology elements in different RATs are typically driven by performance targets. For example, performance requirements impose constraints on usable subcarrier spacing sizes, e.g. the maximum acceptable phase noise sets the minimum subcarrier bandwidth while the slow decay of the spectrum (impacting filtering complexity and guardband sizes) favors smaller subcarrier bandwidth for a given carrier frequency, and the required cyclic prefix sets the maximum subcarrier bandwidth for a given carrier frequency to keep overhead low. However, the numerology used so far in the existing RATs is rather static and typically can be trivially derived by the UE, e.g., by one-to-one mapping to RAT, frequency band, service type (e.g., Multimedia Broadcast Multicast Service (MBMS)), etc.

In LTE downlink which is OFDM-based, the subcarrier spacing is 15 kHz for normal CP and 15 kHz and 7.5 kHz (i.e., the reduced carrier spacing) for extended CP, where the latter is allowed only for MBMS-dedicated carriers.

The support of multiple numerologies has been agreed for NR, which numerologies can be multiplexed in the frequency and/or time domain for the same or different UEs. In NR which is to be based on OFDM, the multiple numerologies will be supported for general operation. A scaling approach (based on a scaling factor $2^n$, $n \in N\_0$) is considered for deriving subcarrier spacing candidates for NR. Values for subcarrier bandwidths currently discussed include among others 3.75 kHz, 15 kHz, 30 kHz, 60 kHz. The numerology-specific slot durations can then be determined in ms based on the subcarrier spacing: subcarrier spacing of $(2^n*15)$ kHz, m being an integer, gives exactly ½m 0.5 ms for a slot that is 0.5 ms in the 15 kHz numerology. Subcarrier spacings of at least up to 480 kHz are currently being discussed for NR (the highest discussed values correspond to millimeter-wave based technologies). It has also been agreed that multiplexing different numerologies within a same NR carrier bandwidth is supported, and FDM and/or TDM multiplexing can be considered. It has further been agreed that multiple frequency/time portions using different numerologies share a synchronization signal, where the synchronization signal refers to the signal itself and the time-frequency resource used to transmit the synchronization signal. Yet another agreement is that the numerology used can be selected independently of the frequency band although it is assumed that a very low subcarrier spacing will not be used at very high carrier frequencies.

In NR the transmission bandwidth of a single carrier transmitted by a network node (also known as gNB) may be larger than the UE bandwidth capability, or the configured receiver bandwidth of a connected device (such as UE). Each gNB may also transmit using different numerologies which are time division multiplexed (TDM) or frequency division multiplexed (FDM).

Reference signals, also known as "pilots" or "pilot signals", can be used in wireless communication for estimating the properties of a radio channel. Reference (pilot) signal aided channel estimation is a widely used technique to enable wireless access points and UEs to acquire channel state information at the transmitter and/or receiver (CSIT/CSIR). When multiple UEs are multiplexed on the same or overlapping time and frequency resources using spatial multiplexing, orthogonal reference or pilot sequences are used to acquire CSIT/CSIR for each UE. By orthogonal sequences is meant sequences that are basically non-overlapping, uncorrelated, or independent in a mathematical sense and, when transmitted as signals, do not interfere with each other.

To ensure a high degree of orthogonality among the UEs, sufficiently long reference or pilot sequences must be used. In systems with spatial multiplexing of multiple wireless devices or UEs, such as Multi-user multiple-input and multiple-output (MU-MIMO) systems, orthogonal reference sequences allow multiple users (UEs) to be spatially multiplexed on the same or overlapping time/frequency resources as long as the reference sequences of these UEs can be separated in the code domain. The number of orthogonal reference sequences and thereby the maximum number of MU-MIMO users (UEs) is limited by the length of the reference sequences.

For example, in the uplink of LTE systems, UEs use orthogonal demodulation reference signals (DMRS) to enable the base station (BS) to acquire CSIR. The DMRS is constructed by means of cyclically shifted Zadoff-Chu sequences that are mapped on predefined resource elements (subcarriers) of specific single carrier frequency division multiplexed (SC-FDM) symbols within the physical resource blocks (PRB) on which the UE is scheduled.

A fundamental trade-off is related to the number of resource elements (complex symbols) used for reference sequence construction and transmission and the resource elements available for data symbols within the fixed number of totally available resource elements within the PRB on which the UE is scheduled. When BSs are equipped with a large number of antennas, they can support the spatial multiplexing of many users provided that these users can be assigned near orthogonal reference (pilot) sequences. In multi carrier systems, such as OFDM for multicell MU MIMO systems, a large number of users may be served simultaneously in neighbor cells. When the length and thereby the number of distinct reference (pilot) sequences are constrained, the reference (pilot) sequences must necessarily be reused by neighboring BSs. These systems are casually referred to as "pilot reuse-1" systems, since the same set of reference (pilot) sequences are applied in neighboring cells. In pilot reuse-1 systems, when multiple UEs use the same reference (pilot) sequence, they cause interference to each other at the BS. This interference is often referred to as pilot contamination (PC). Pilot contamination degrades the quality of channel estimation (both for CSIT/CSIR) which in turn leads to degraded Uplink/Downlink (UL/DL) throughput.

There is thus a need to provide longer reference sequences to be able to serve more simultaneously spatially multiplexed users using orthogonal sequences.

SUMMARY

An object of the present disclosure is to provide methods and devices which seek to mitigate, alleviate, or eliminate one or more of the above-identified deficiencies in the art and disadvantages singly or in any combination.

This object is obtained by a method, for use in a wireless device in a multi carrier system supporting spatial multiplexing of wireless devices, for transmitting a reference signal to a network node. The method comprises receiving information indicating at least one frequency subcarrier spacing, the frequency subcarrier spacing being based on at least the number of scheduled spatially multiplexed wireless devices in the multi carrier system, determining a sequence of a reference signal based at least on the received information, and transmitting the reference signal to a network node in resource elements of a reference signal carrying symbol using the received information. The proposed solution allows for flexible adaption of the number of subcarriers in a given frequency range by altering the subcarrier spacing, where the number of subcarriers within a reference signal carrying symbol can be adapted to the number of spatially multiplexed devices. The number of subcarriers (or REs) within a symbol corresponds to the number of complex symbols of the reference sequence that can be accommodated within that symbol, and thus a greater number of subcarriers renders a longer reference sequence. The reference signal carrying symbol is the time symbol, such as an OFDM symbol, that accommodates the reference sequence and thus carries the reference signal when transmitted. According to some aspects, determining a sequence of a reference signal comprises determining the sequence of the reference signal such that the sequence becomes orthogonal compared to other reference sequences within the multi carrier system. The number of spatially multiplexed devices determines the number of orthogonal reference sequences that is needed, and thus the length of the reference sequences that is needed to make the sequences orthogonal, which corresponds to the number of subcarriers which in turn depends on the subcarrier spacing.

According to some aspects, the method further comprises mapping the sequence of the reference signal to resource elements in a reference signal carrying symbol using the received information. The reference sequence is mapped to a reference signal carrying symbol having the frequency spacing as specified in the received information.

According to some aspects, receiving information indicating a frequency subcarrier spacing comprises receiving the information from a network node, wherein the received information is at least one numerology and mapping a sequence of a reference signal to resource elements in a reference signal carrying symbol comprises mapping the sequence to resource elements in a reference signal carrying symbol using the frequency subcarrier spacing of said numerology.

According to some aspects, the received information or numerology indicates a reduced frequency subcarrier spacing, the frequency subcarrier spacing being reduced compared to a baseline or preconfigured frequency subcarrier spacing, or frequency subcarrier spacing of a baseline numerology. In one aspect, the frequency subcarrier spacing is reduced for all symbols. The received subcarrier spacing is thus applied to all symbols, both data and reference carrying symbols. In another aspect, several numerologies are used and the frequency subcarrier spacing is reduced only in reference signal carrying symbols.

According to some aspects, the disclosure proposes a method for use in a network node in a multi carrier system supporting spatial multiplexing of wireless devices, for receiving a reference signal from a wireless device. The method comprises obtaining information indicating at least one frequency subcarrier spacing, the frequency subcarrier spacing being based on at least the number of scheduled spatially multiplexed wireless devices in the multi carrier system, transmitting the obtained information to a wireless device, and receiving a reference signal from the wireless device, the reference signal being received in resource elements of a reference signal carrying symbol using the indicated frequency subcarrier spacing. The network node transmits the frequency subcarrier spacing to the wireless device, which then uses this frequency subcarrier spacing for transmitting a sequence of a reference signal to the network node, which receives the reference signal in a time symbol applying the transmitted frequency subcarrier spacing.

According to some aspects, the method further comprises receiving information from a wireless device indicating one or more of measurement reports, numerologies that the wireless device is able to use and the speed of the wireless device, and wherein the obtaining information is based at least on the received information. The wireless device may thus signal to the network node information on which a decision regarding the frequency subcarrier spacing can be based.

According to some aspects, the obtained information is at least one numerology and obtaining information indicating at least one frequency subcarrier spacing comprises determining at least one numerology in the network node or receiving the at least one numerology from another node. The network node may thus determine the frequency subcarrier spacing or numerology autonomously, using information from other nodes or the wireless device, or the decision may be made in another node, such as another base station or cloud node, and the decision is then signaled to (obtained by) the network node that then transmits the determined frequency subcarrier spacing or numerology to the wireless device.

According to some aspects, the method further comprises using the received reference signal for channel estimation. The network node may use the reference signal for estimation of the uplink channel quality.

According to some aspects, the disclosure proposes a wireless device, in a multi carrier system supporting spatial multiplexing of wireless devices, configured for transmitting a reference signal to a network node. The wireless device comprises a communication interface and processing circuitry configured to cause the wireless device to receive information indicating a frequency subcarrier spacing, the frequency subcarrier spacing being based at least on the number of scheduled spatially multiplexed wireless devices in the multi carrier system, to determine a sequence of a reference signal based at least on the received information, and to transmit the reference signal to a network node (20) in resource elements of a reference signal carrying symbol using the received information.

According to some aspects, the disclosure proposes a network node, in a multi carrier system supporting spatial multiplexing of wireless devices, configured for receiving a reference signal from a wireless device, the network node comprises a communication interface, processing circuitry configured to cause the network node to obtain information indicating at least one frequency subcarrier spacing, the frequency subcarrier spacing being based on at least the number of scheduled spatially multiplexed wireless devices in the multi carrier system, to transmit the obtained information to a wireless device and to receive a reference signal from the wireless device, the reference signal being received in resource elements of a reference signal carrying symbol using the indicated frequency subcarrier spacing.

According to some aspects, the disclosure proposes a computer program comprising computer program code which, when executed in a wireless device, causes the wireless device to execute the methods described below and above.

According to some aspects, the disclosure proposes a computer program comprising computer program code which, when executed in a network node, causes the wireless device to execute the methods described below and above.

According to some aspects, the disclosure proposes a carrier containing the computer program, wherein the carrier is one of an electronic signal, optical signal, radio signal, or computer readable storage medium.

DETAILED DESCRIPTION

Figure 1:
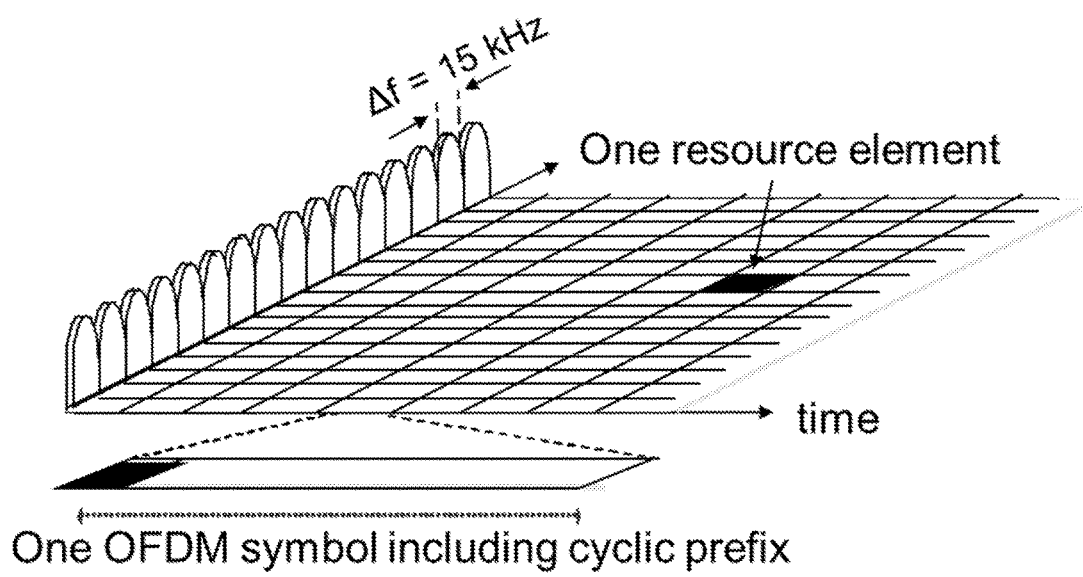
FIG. 1 illustrates the LTE downlink physical resource seen as a time/frequency grid.
Figure 2:
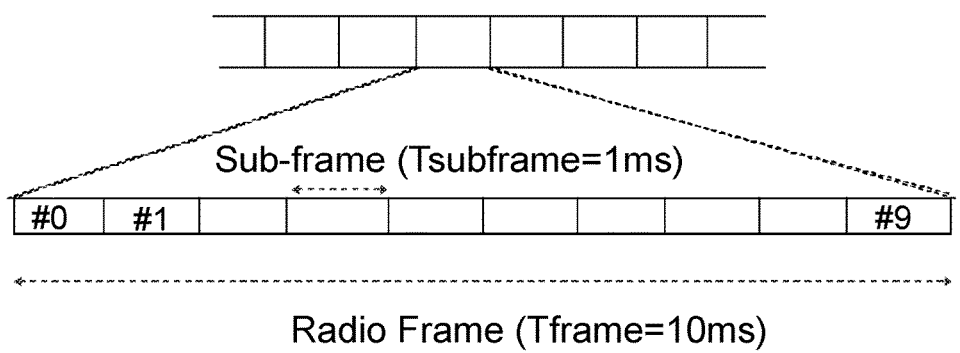
FIG. 2 is an illustration of the LTE time-domain structure.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPad, Tablet, mobile terminals, smart phone, laptop embedded equipped (LEE), laptop mounted equipment (LME), USB dongles, Customer Premises Equipment (CPE) etc. Also in some embodiments generic terminology "network node", is used. It can be any kind of network node which may comprise of a radio network node such as base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), TP (transmission point), TRP (transmission reception point), a core network node (e.g., MME, SON node, a coordinating node, positioning node, MDT node, etc.), or even an external node (e.g., 3rd party node, a node external to the current network), etc. The network node may also comprise a test equipment.

A reference signal herein refers to a pre-known signal, which is known to both transmitter and receiver. The reference signal is typically characterized by a certain symbol or symbol sequence (a sequence of one or more symbols). The receiver monitors the radio channel for this pre-known signal (symbol sequence) and when a match is found the reference signal is detected. The symbol sequence carried by the reference signal could be referred to as a reference signal sequence, a sequence of a reference signal or reference sequence. One such complex symbol can be accommodated in each RE, and for example one (OFDM) symbol of 12 RE (12 subcarriers) can accommodate a 12 complex symbol long reference sequence. The reference signal is transmitted to the network node, the reference signal carries the reference sequence, which is mapped to REs in a time symbol, such as an OFDM symbol, sometimes referred to as a reference signal carrying symbol.

In systems using orthogonal frequency division multiplexing (OFDM), high peak-to-average power ratio (PAPR) of the transmitted signal may be a problem, since too large peaks may lead to performance degradation, for example, when the signal passes through a nonlinear power-amplifier. The non-linearity of the power amplifier can lead to signal distortion as well as out-of-band radiation and adjacent channel leakage.

A possible method to mitigate the effects of too high PAPR is clipping, which consists of deliberately clipping the OFDM signal prior to amplification. Clipping can reduce the PAPR but may cause both in-band and out-of-band interference and may degrade the orthogonality among the subcarriers. As an alternative or complimentary technique, coding techniques can select code-words that reduce the PAPR of the physical signal.

Another metric that describes how peaky a waveform is in time-domain is the cubic metric (CM). The CM relates to the power backoff one must apply to stay within the linear region of power amplifiers which are dominated by third order non-linearities. UE power amplifiers are often approximated by third order non-linearities and the CM is therefore often used together with UE transmissions.

The proposed technique is based on the idea to utilize a dense subcarrier spacing within a determined frequency bandwidth, which increases the number of subcarriers within said determined bandwidth without increasing the bandwidth itself, for the transmission of reference signals from wireless devices to network nodes. A reduced subcarrier spacing of the symbols accommodating the reference sequence of the reference signal gives the possibility to create longer reference sequences within said symbols, which thus gives a greater number of orthogonal reference sequences without increasing the PAPR.

As an example, consider a multi carrier system of several simultaneously spatially multiplexed wireless devices, such as a MU-MIMO system, in which it is desirable to provide long orthogonal pilot sequences that allow the code domain separation of spatially multiplexed users. For illustration purposes, the uplink of an OFDM or SC-FDM system is used, in which CSIT/CSIR acquisition is assisted by pilot signals mapped onto the resource elements (subcarriers) of the scheduled physical resource blocks (PRBs). In the sequel OFDM is used as an example of a multi carrier system, but the skilled person understands that the technique is applicable to any other multi-carrier (e.g. universal filtered multi-carrier (UFMC or UF-OFDM), filter bank multicarrier (FBMC), filtered/windowed OFDM) or precoded multi-carrier (e.g. single-carrier frequency-division multiplexing (SC-FDM), discrete Fourier transform spread OFDM (DFTS-OFDM), Zero-tail discrete Fourier transform spread OFDM (ZT-DFTS-OFDM), or Orthogonal time frequency spreading (OTFS)) systems. Thus, the symbols used are not necessarily OFDM symbols even though OFDM symbols are used as an example, and these may therefore be referred to as 'time symbols' or just 'symbols' in the present disclosure.

An existing technique to provide for longer pilot sequences is to use more than one OFDM symbol. For example, in the case of a single OFDM symbol where e.g. 12 subcarriers are used to carry pilot sequences, a theoretical maximum of 12 orthogonal codes can be fully orthogonal in the code domain. If a sequence with favorable PAPR/CM properties—such as a Zadoff-Chu sequence—is used, the corresponding OFDM time-domain signal has low PAPR/CM. To increase the sequence multiplexing space a longer sequence—e.g. 24 elements—can be mapped to two OFDM symbols. In this example 12 out 24 sequence elements are mapped to the first OFDM symbol and the remaining 12 sequence elements to the second OFDM symbol. That is, only half a sequence is mapped to each OFDM symbol which leads to high PAPR/CM when transformed into time-domain. This may lead to degraded bit error rate and spectral efficiency performance significantly reducing the possible gain of increasing the number of supported MU-MIMO users. In general, it is a problem to ensure sufficiently many orthogonal pilot sequences—with respect to the number of simultaneously served users—and keep the PAPR of the pilot signals low in MU-MIMO systems.

An alternative would be to allocate twice as many subcarriers in one OFDM symbol to pilot transmission. However, this doubles the allocated bandwidth and may even be infeasible if the originally allocated bandwidth was close to the full system bandwidth, a common case MU-MIMO with many antennas.

In example embodiments, the subcarrier spacing is decreased in the frequency domain with respect to a base line scheme when there is a need to create longer pilot sequences and thereby support a greater number of orthogonal sequences. The subcarrier frequency is decreased so that the number of subcarriers is increased within a given frequency chunk without increasing said frequency chunk. Decreasing the subcarrier spacing (increasing the subcarrier density in the frequency domain) is a viable technique as long as the spacing remains sufficiently large with respect to the Doppler shift in the (mobile) environment in which the UEs operate.

The proposed technique thus increases the sequence length of pilots, taking into constraints of the propagation environment, supported by a single OFDM symbol. Since now the complete pilot sequence (e.g. Zadoff-Chu) is mapped to a single OFDM symbol, the sequence properties are maintained and the corresponding time-domain waveform has low PAPR/CM.

For example, if the baseline scheme uses a subcarrier spacing of 15 kHz and 12 subcarriers per OFDM symbol (PRB), a denser subcarrier spacing of 7.5 kHz enables 24 subcarriers within the PRB of the same bandwidth. By the proposed solution, the pilot sequence length is extended without increasing the PAPR/CM. Furthermore, the cyclic prefix (CP) duration can be increased under the same CP overhead constraint. A larger CP is beneficial since pilot contamination becomes the main impairment in systems with many antennas. Even reference (pilot) sequences that are orthogonal interfere if received outside the CP (due to too long propagation delay). With a longer CP, the distance from which reference (pilot) sequences are still received within the CP increases, i.e. even reference (pilot) sequences transmitted from far away remain orthogonal. Thus, reference signal sequences can be transmitted from more distant locations and still be received within the CP if the CP is longer, and will thus avoid interfering with each other.

In one embodiment only the subcarrier spacing of the OFDM symbol carrying reference signals is decreased. E.g. if a "regular" subframe contains 14 regularly spaced OFDM symbols, a subframe with an optimized reference signal structure could contain 12 regularly spaced OFDM symbols plus 2 OFDM symbols (which carriers the sequence of the reference signal) with half as wide subcarrier spacing being twice as long in time. The subframe duration is thereby maintained in this embodiment. In the denser subcarrier spacing structure there is thus twice as many subcarriers within one OFDM symbol, which gives the possibility to construct longer pilot sequences carried within one symbol, avoiding a need to split a long pilot sequence between 2 OFDM symbols. Thus, the second OFDM symbol within the subframe (in the 2nd slot) can be used to repeat the same pilot sequence, which increases the channel estimation quality.

In another embodiment all OFDM symbol in a subframe use a decreased subcarrier spacing. Here the subframe duration changes accordingly.

The embodiments adapt the wireless system to the prevailing demands in terms of number of MU-MIMO users that must be supported and can take into account environment specific constraints arising from Doppler shift, phase noise or the delay spread of the wireless channels by properly and dynamically selecting the numerology of the symbols carrying the resource elements used for pilot sequence creation. The technique allows for supporting a great number of MU-MIMO users by creating sufficiently long reference sequences without increasing the PAPR of the reference signals.

The present aspects of the embodiments comprise a wireless device for transmitting a reference signal, wherein at least reference signal carrying symbols use a dense subcarrier spacing. The subcarrier spacing could be part of a numerology configuration transmitted to the wireless device from a network node. The dense subcarrier spacing is a reduced subcarrier spacing compared to a baseline scheme, a scheme of a baseline numerology, a scheme of a default numerology or a previously used numerology.

Figure 3:
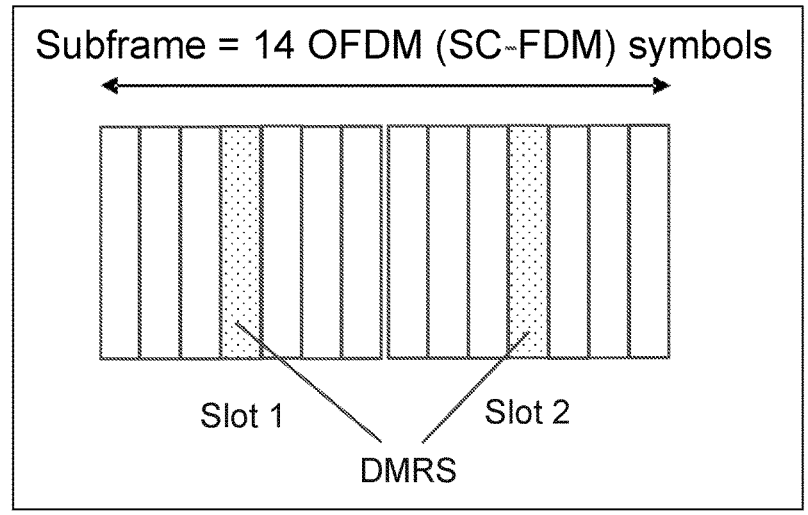
FIG. 3 illustrates an example of a baseline subcarrier spacing of a baseline numerology.
Figure 4:
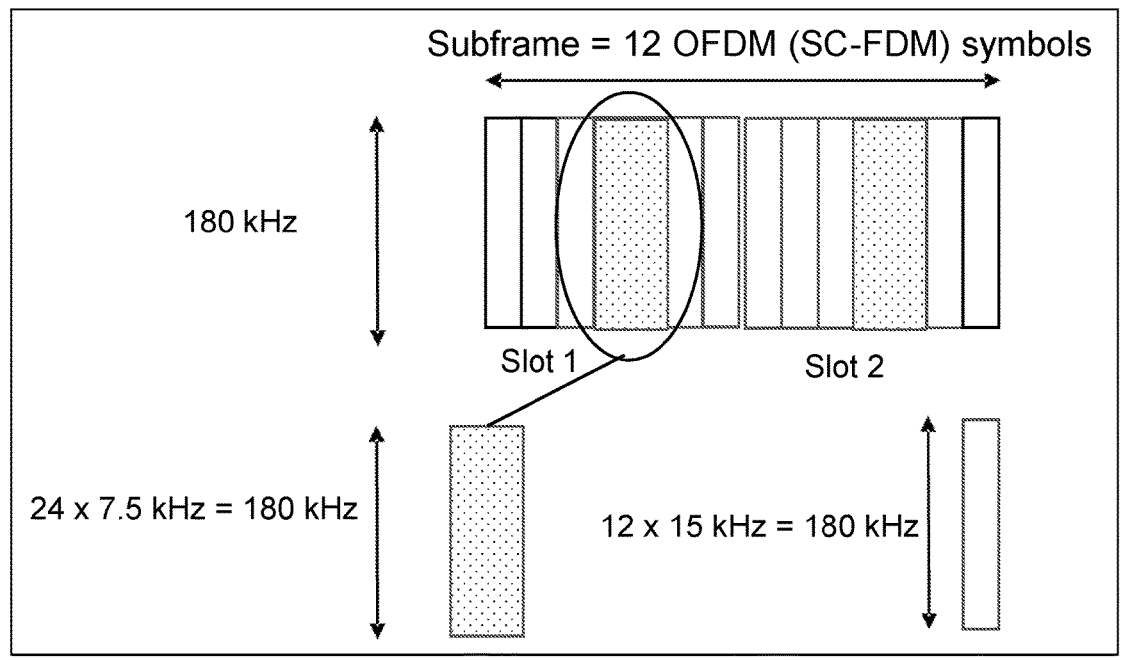
FIG. 4 illustrates an example of using denser subcarrier spacing (and longer symbol time) for the OFDM/SC-FDM symbols which carry reference sequence symbols.

A specific illustrative example to exemplify the basic idea is shown by FIG. 3 and FIG. 4. The basic baseline scheme for subcarrier spacing adaptation for the reference symbols could be seen in FIG. 3. FIG. 3 shows an example of the baseline subcarrier spacing of the baseline numerology similar to that used by the uplink of LTE systems to create demodulation reference signals (DMRS) by using 2 symbols per subframe (1/slot). The figure uses 7 OFDM (SC-FDM) symbols per slot as an example, similarly to the LTE slot structure. However, a baseline numerology used in NR might have other baseline parameters, such as another PRB bandwidth than 180 kHz and another subcarrier spacing than 15 kHz as typically used in LTE. FIG. 3 is a typical design similar to that used in the uplink of LTE by the demodulation reference signals (DMRS) that can be used by the BS to, for example, acquire CSIR for the demodulation of the PHY uplink shared channel signals.

An exemplary embodiment of the present disclosure is seen in FIG. 4, which shows an example of using denser subcarrier spacing (and longer symbol time) for the OFDM/SC-FDM symbols which carry reference symbols. In this example, the subcarrier spacing is half of that of FIG. 3 for the pilot subcarriers; that is 7.5 kHz. This doubles the number of resource elements within a single symbol and PRB bandwidth (24 resource elements instead of 12). Notice that the subcarrier spacing and the number of resource elements (12×15 kHz) within the symbols carrying data is unchanged as compared with FIG. 3.

In the baseline design (FIG. 3), a subframe consisting of 2×7=14 OFDM symbols in the time domain shown. In this structure, each symbol has 12 subcarriers per PRB with subcarrier spacing of 15 kHz forming a resource block of 12×15=180 kHz. In this setting, the symbol carrying 12 resource elements can accommodate maximum 12 complex symbol long orthogonal pilot sequences. In contrast, the numerology used in the example of FIG. 4 uses half subcarrier spacing (7.5 kHz) in the frequency domain allowing for 24 subcarriers (resource elements) within the OFDM symbol used for pilot sequence construction (FIG. 4). Depending on the number of resource blocks allocated to reference sequences for a user, the total number of reference sequence subcarriers would be N*24 and the number of regular subcarriers would be N*12, with N the number of allocated resource blocks.

As illustrated in FIG. 4, the symbol duration time is doubled and the number of symbols per slot in the example of FIG. 4 is 5+1=6.

Notice that the subframe structure of FIG. 4 uses a mixed numerology for pilot and data symbols. It should be clear for the skilled person that adaptive subcarrier spacing can be applied to the data symbols as well. That allows for homogeneous numerologies for the pilot and data symbols.

Figure 5:
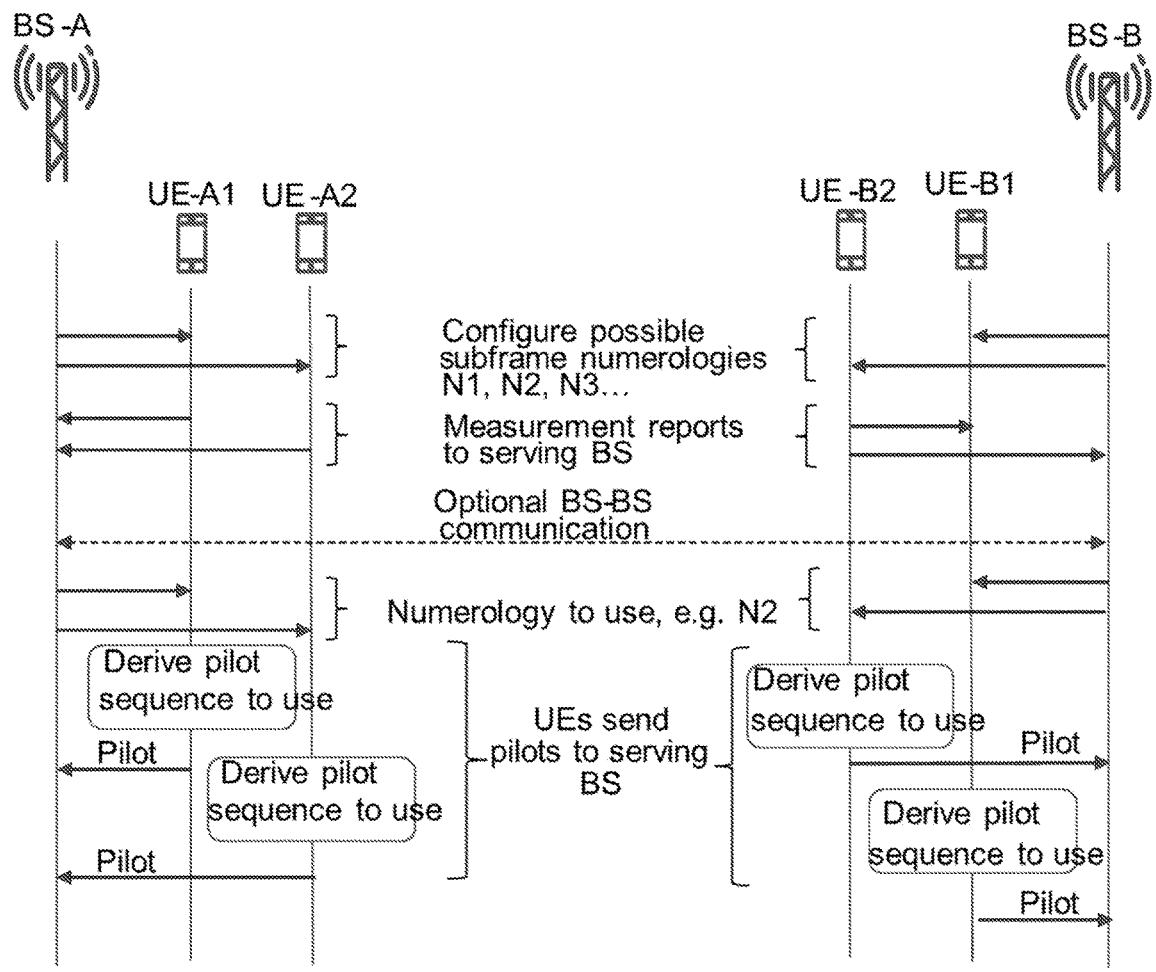
FIG. 5 is a signaling diagram showing an example of messages exchanged between the served UEs and their serving BS.

FIG. 5 shows an example of messages exchanged between the served UEs and their serving BS. Notice that optionally, the BS can exchange information on the number of served users and parts of their measurement reports and/or preferred numerology to use in the served cell. "Numerology to use" could either refer to the reference signal numerology (if reference signal and data use different numerologies) or to a common numerology used for reference signal and data.

The steps of performing the configuration of the numerology to be used by the served UEs are shown in FIG. 5. The BS may use periodic broadcast messages or dedicated (e.g. Radio Resource Control, RRC) messages to inform the served UEs about the numerology(ies) to be used by the UE in the cell or coverage area of the BS. The UEs may also indicate to the BS the numerologies they are able to use.

Also, the UEs send regular measurement reports to the BS, which allows the BS to estimate the main characteristics of the propagation channels, as well as UE speed and derive estimates of related parameters and characteristics such as Doppler effects or delay spread. The BS can use existing techniques to determine the desired number of simultaneously scheduled MU-MIMO users and consequently the minimum length of reference sequences.

Based on this information, the BS derives the preferred numerology out of the possible ones and communicates this decision to the UEs. The UEs, in turn, use this piece of information and possibly other information, such as the physical cell identity or UE identity to derive a unique reference sequence (e.g. a Zadoff-Chu base sequence index and shift amount) that is orthogonal within the cell. Once the UEs determined the reference sequence to use, they can map that sequence to the pilot subcarriers of the specific numerology that is currently in use in the cell. The reference signal (the sequence of the reference signal) is then transmitted to the network node, which can use the received reference signal for e.g. channel estimation, such as estimation of the physical uplink shared channel (PUSCH).

This process can be repeated periodically or on an event driven basis, triggered e.g. by new incoming measurement reports from the UEs.

This approach may also be used in a Multicell scenario. When sufficiently long sequences are available, neighbor cells can use orthogonal sequences to avoid or reduce pilot contamination effects. To realize non-overlapping sets of reference sequences among neighbor cells, neighbor BSs may use inter network node signaling (e.g. X2 signaling) to inform one another about the preferred or currently used numerology and/or the set of reference sequences that they use.

Example Operations

The proposed methods will now be described in more detail referring to FIGS. 6 and 7. It should be appreciated that FIGS. 6 and 7 comprise some operations and modules which are illustrated with a solid border and some operations and modules which are illustrated with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations do not need to be performed in order. Furthermore, it should be appreciated that not all of the operations need to be performed.

Figure 6:
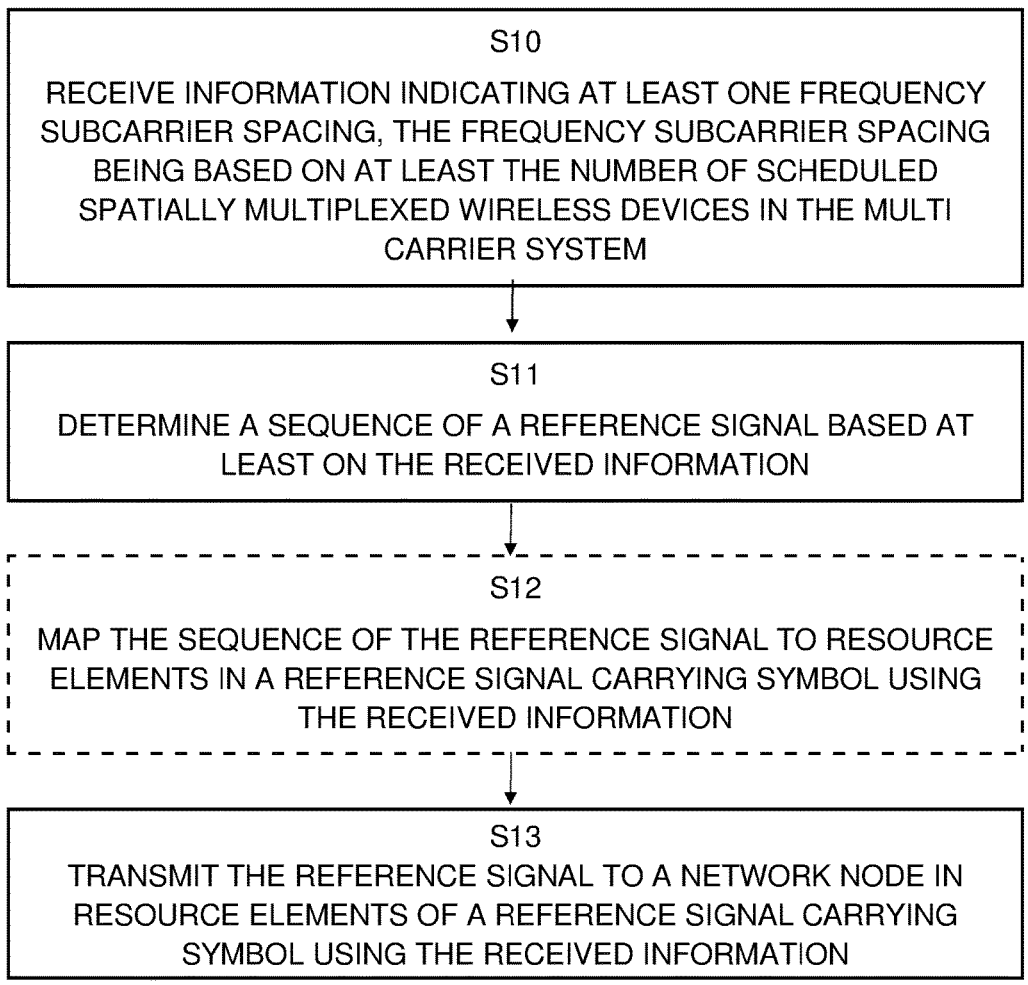
FIG. 6 is a flowchart of an exemplary process for transmitting a reference signal.
Figure 7:
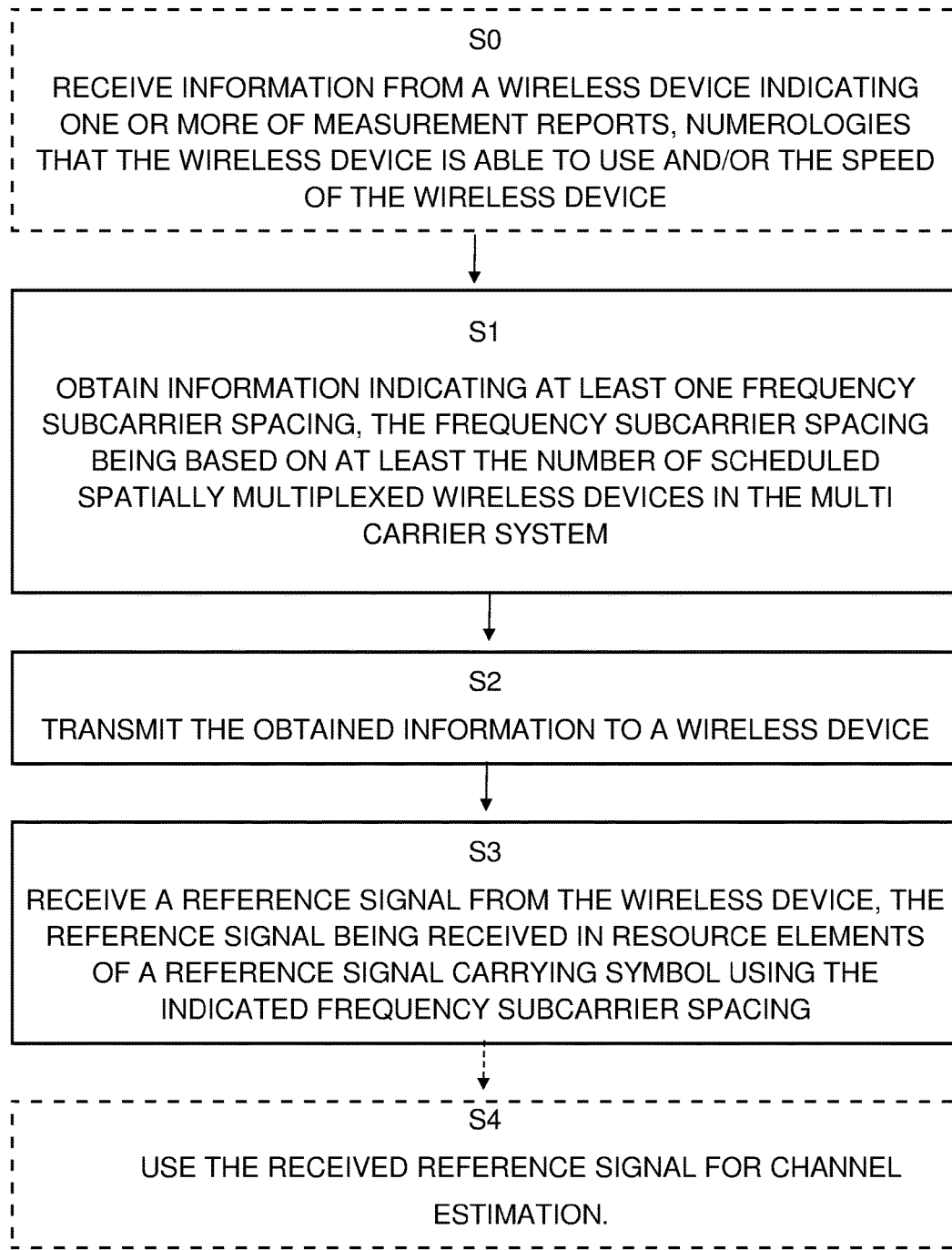
FIG. 7 is a flowchart of an exemplary process for receiving a reference signal.

FIG. 6 illustrates a method, performed in a wireless device, the device being part of a multi user multi carrier system supporting spatial multiplexing of wireless devices, for transmitting a reference signal to a network node. The multi carrier system may be any kind of multi carrier system, such as an OFDM system or similar, a multi carrier system which is configured for MU-MIMO transmissions that supports simultaneous spatial multiplexing of several wireless devices. The reference signal may be any kind of reference signal transmitted by wireless devices, such as DM-RS. The method comprises receiving S10 information indicating at least one frequency subcarrier spacing of a physical resource block (PRB) for use in uplink transmission, the frequency subcarrier spacing being based on at least the number of simultaneously scheduled spatially multiplexed wireless devices in the multi carrier system. The frequency subcarrier spacing of time symbols to be used by the wireless device for uplink transmission is received, the frequency subcarrier spacing being related to the number of spatially multiplexed users, which is a measure of the load in the system. The method further comprises determining S11 a sequence of a reference signal based at least on the received information. The wireless device determines a sequence of a reference signal, i.e. the sequence of complex numbers carried by the reference signal based on the received information. The received information indicates the frequency subcarrier spacing and optionally also a numerology to be used by the wireless device, and may also contain information regarding a baseline or default numerology and the preferred length of the reference sequence based on the number of spatially multiplexed users. In one aspect, determining a sequence of a reference signal may comprise determining the sequence of the reference signal such that the sequence becomes orthogonal compared to other reference sequences of the simultaneously scheduled spatially multiplexed devices within the multi carrier system. All spatially multiplexed users (wireless devices) in the system should preferably use orthogonal or near orthogonal sequences that do not interfere with each other, which requires a certain length of the sequences, said required sequence length being dependent on the number of users.

The method further comprises transmitting S13 the reference signal to a network node in resource elements of a reference signal carrying symbol using the frequency subcarrier spacing of the received information. The wireless device transmits the reference signal to the network node in RE of a PRB in a reference signal carrying symbol applying the received frequency subcarrier spacing. The method may further comprise mapping S12 the sequence of the reference signal to resource elements in a reference signal carrying symbol using the received information. The sequence of complex numbers constituting the reference sequence is mapped to REs in a reference carrying time symbol, wherein the number of REs corresponds to the number of subcarriers attained by using the received frequency subcarrier spacing.

According to some aspects, receiving information indicating a frequency subcarrier spacing comprises receiving the information from a network node. According to one aspect, the received information is at least one numerology and mapping a sequence of a reference signal to resource elements in a reference signal carrying symbol comprises mapping the sequence to resource elements in a reference signal carrying symbol using the frequency subcarrier spacing of said numerology. A numerology defines several parameters to be used by the wireless device, such as the frequency subcarrier spacing, and the received frequency subcarrier spacing may be part of a received numerology. In one aspect, the received information or numerology indicates a reduced frequency subcarrier spacing, the frequency subcarrier spacing being reduced compared to a baseline or preconfigured frequency subcarrier spacing, or frequency subcarrier spacing of a baseline numerology. The reduction may thus be in view of a baseline or default frequency subcarrier spacing or numerology, a previously used or preconfigured frequency subcarrier spacing or numerology, one that for example has been previously derived at system attach, i.e. when the wireless device does the initial access and reads system information. At this point the wireless device receives the preconfigured frequency subcarrier spacing or numerology. The baseline or preconfigured frequency subcarrier spacing or numerology may also be signaled to the wireless device just before the reduced frequency subcarrier spacing or numerology, or received in the same information that indicates the reduced frequency subcarrier spacing or numerology. In some aspects, the number of subcarriers is increased while the total subcarrier frequency bandwidth is maintained, compared to a preconfigured or baseline configuration.

According to some aspects, several numerologies are used and the frequency subcarrier spacing is reduced only in reference signal carrying symbols. The other symbols, such as the data carrying symbols, still apply the preconfigured or baseline frequency subcarrier spacing or numerology. In other aspects, the frequency subcarrier spacing is reduced for all symbols in the PRB. The subframe duration may either be maintained or changed when applying the reduced frequency subcarrier spacing or numerology. If the subframe duration is to be maintained when the subcarrier spacing for any time symbol (reference or data carrying) is halved as compared to an initial default (baseline), then the duration of the time symbol (e.g. OFDM symbol) will double (Tofdm=1/Df), Df being the frequency subcarrier spacing. The subframe duration can be kept constant by altering the number of OFDM symbols within the subframe, or we can keep the number of OFDM symbols and alter the subframe duration instead.

In some aspects, the received information or numerology indicates a cyclic prefix (CP) to be used by the wireless device, wherein the CP duration is increased while the CP overhead is maintained. This allows for a better reception of the reference signals, since it reduces pilot contamination.

In some aspects, the baseline or preconfigured frequency subcarrier spacing is 15 kHz and the reduced frequency subcarrier spacing is 7.5 kHz. The baseline numerology may be frequency specific, for example the default or baseline frequency subcarrier spacing or numerology used in a specific carrier frequency may vary, for example the baseline frequency subcarrier spacing may be 15 kHz for carrier frequencies below 6 GHz. For other carrier frequencies, the baseline frequency subcarrier spacing or numerology may be different. The baseline may be a predefined subcarrier spacing for a given frequency range.

A corresponding method, performed in a network node, for receiving a reference signal, will now be described referring to FIG. 7. FIG. 7 illustrates a method for use in a network node in a multi carrier system supporting spatial multiplexing of wireless devices, for receiving a reference signal from a wireless device. The method comprises obtaining S1 information indicating at least one frequency subcarrier spacing, the frequency subcarrier spacing being based on at least the number of scheduled spatially multiplexed wireless devices in the multi carrier system. The network node obtains information indicating at least one frequency subcarrier spacing, wherein one of the at least one obtained frequency subcarrier spacing is defining the frequency subcarrier spacing to be used by the wireless device for transmitting the reference signal. Optionally, the network node also obtains the baseline frequency subcarrier spacing or another frequency subcarrier spacing to be used for data carrying symbols or in a different carrier frequency. The obtained information is at least one numerology and obtaining information indicating at least one frequency subcarrier spacing comprises determining at least one numerology in the network node or receiving the at least one numerology from another node. The obtaining of the frequency subcarrier spacing or numerology may thus either be determining by the network node itself, or by another network node or cloud node and then signaled to the network node.

The method further comprises transmitting S2 the obtained information to a wireless device, thus transmitting the frequency subcarrier spacing to be used by the wireless device for transmitting the reference signal. In one aspect, transmitting the obtained information or at least one numerology to the wireless device comprises transmitting by dedicated signaling or broadcasting to the wireless device.

The method further comprises receiving S3 a reference signal from the wireless device, the reference signal being received in resource elements of a reference signal carrying symbol using the indicated frequency subcarrier spacing.

In some aspects, the method further comprises receiving S0 information from a wireless device indicating one or more of measurement reports, numerologies that the wireless device is able to use and the speed of the wireless device, and wherein the obtaining information is based at least on the received information. The determined or obtained frequency subcarrier spacing or numerology may thus be based on information received from the wireless device In some aspects, the method further comprises using S4 the received reference signal for channel estimation. The network node may use the reference signals for e.g. uplink channel estimation.

In some aspects, the indicated frequency subcarrier spacing is reduced compared to a preconfigured or baseline frequency subcarrier spacing, or frequency subcarrier spacing of a baseline or preconfigured numerology, in at least one of the at least one indicated frequency subcarrier spacings or numerologies. At least one of the obtained frequency subcarrier spacing or numerology is to be used by the wireless device for transmitting reference signals, and said frequency subcarrier spacing or numerology should be reduce compared to a baseline or preconfigured frequency subcarrier spacing or numerology. Optionally, another frequency subcarrier spacing or numerology can be obtained, which is then either the baseline or preconfigured frequency subcarrier spacing or numerology or another frequency subcarrier spacing or numerology to be used for data carrying symbols if they do not use the same frequency subcarrier spacing or numerology as the reference signal carrying symbols. Thus, the number of subcarriers is increased while the total subcarrier frequency bandwidth is maintained in the obtained information or at least one numerology compared to a preconfigured or baseline frequency subcarrier spacing, or frequency subcarrier spacing of a preconfigured or baseline numerology.

In one aspect, several frequency subcarrier spacings or numerologies are used, and the frequency subcarrier spacing is reduced only in reference signal carrying symbols. In another aspect, the frequency subcarrier spacing is reduced for all symbols.

In some aspects, the obtained information or numerology indicates a cyclic prefix (CP), wherein the CP duration is increased while the CP overhead is maintained.

In some aspects, the preconfigured or baseline frequency subcarrier spacing is 15 kHz and the and the reduced frequency subcarrier spacing is 7.5 kHz.

In some aspects, the multi carrier system is a system configured for MU-MIMO transmissions.

Example Node Configurations

Figure 8:
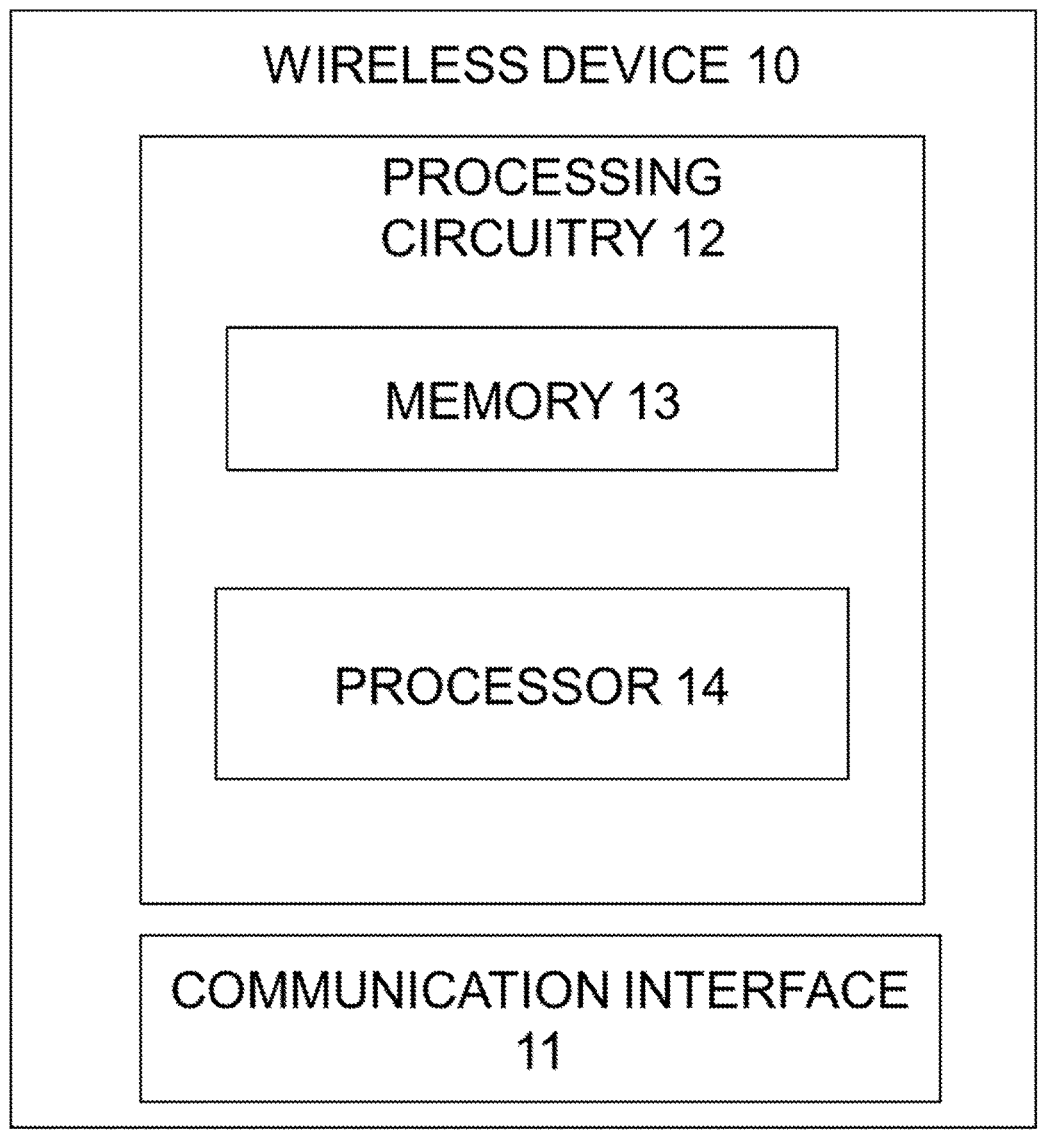
FIG. 8 is a block diagram illustrating a wireless device configured to transmit a reference signal.

Turning now to FIG. 8, which is a schematic diagram that illustrates some modules of an example embodiment of a wireless device being configured for obtaining an identity. The wireless device is configured to implement all aspects of the methods described in relation to FIG. 6.

The wireless device 10 comprises a radio communication interface (i/f) 11 configured for communication with a network node. The radio communication interface 11 may be adapted to communicate over one or several radio access technologies. If several technologies are supported, the node typically comprises several communication interfaces, e.g. one WLAN or Bluetooth communication interface and one cellular communication interface, including LTE or NR.

The wireless device 10 comprises a controller, CTL, or a processing circuitry 12 that may be constituted by any suitable Central Processing Unit, CPU, microcontroller, Digital Signal Processor, DSP, etc. capable of executing computer program code. The computer program may be stored in a memory, MEM 13. The memory 13 can be any combination of a Read And write Memory, RAM, and a Read Only Memory, ROM. The memory 13 may also comprise persistent storage, which, for example, can be any single one or combination of magnetic memory, optical memory, or solid state memory or even remotely mounted memory. According to some aspects, the disclosure relates to a computer program comprising computer program code which, when executed, causes a wireless device to execute the methods described above and below. According to some aspects the disclosure pertains to a computer program product or a computer readable medium holding said computer program. The processing circuitry may further comprise both a memory 13 storing a computer program and a processor 14, the processor being configured to carry out the method of the computer program.

The processing circuitry 12 is configured to cause the wireless device 10 to receive information indicating a frequency subcarrier spacing, the frequency subcarrier spacing being based at least on the number of scheduled spatially multiplexed wireless devices in the multi carrier system, to determine a sequence of a reference signal based at least on the received information, and to transmit the reference signal to a network node 20 in resource elements of a reference signal carrying symbol using the received information.

According to some aspects, the processing circuitry 12 is configured to cause the wireless device 10 to map the sequence of the reference signal to resource elements in a reference signal carrying symbol using the received information.

According to some aspects, to receive information indicating a frequency subcarrier spacing comprises to receive the information from a network node (20).

According to some aspects, to determine a sequence of a reference signal comprises to determine the sequence of the reference signal such that the sequence becomes orthogonal compared to other reference sequences within the multi carrier system (100).

According to some aspects, the received information is at least one numerology and to map a sequence of a reference signal to resource elements in a reference signal carrying symbol comprises mapping the sequence to resource elements in a reference signal carrying symbol using the frequency subcarrier spacing of said numerology.

According to some aspects, the received information or numerology indicates a reduced frequency subcarrier spacing, the frequency subcarrier spacing being reduced compared to a baseline or preconfigured frequency subcarrier spacing, or frequency subcarrier spacing of a baseline numerology.

According to some aspects, the number of subcarriers is increased while the total subcarrier frequency bandwidth is maintained, compared to a preconfigured or baseline configuration.

According to some aspects, several numerologies are used and the frequency subcarrier spacing is reduced only in reference signal carrying symbols.

According to some aspects, the frequency subcarrier spacing is reduced for all symbols.

According to some aspects, the received information or numerology indicates a cyclic prefix (CP), wherein the CP duration is increased while the CP overhead is maintained.

According to some aspects, the baseline or preconfigured frequency subcarrier spacing is 15 kHz and the reduced frequency subcarrier spacing is 7.5 kHz.

According to some aspects, the multi carrier system (100) is configured for multi-user multiple-input and multiple-output (MU-MIMO) transmissions.

Figure 10:
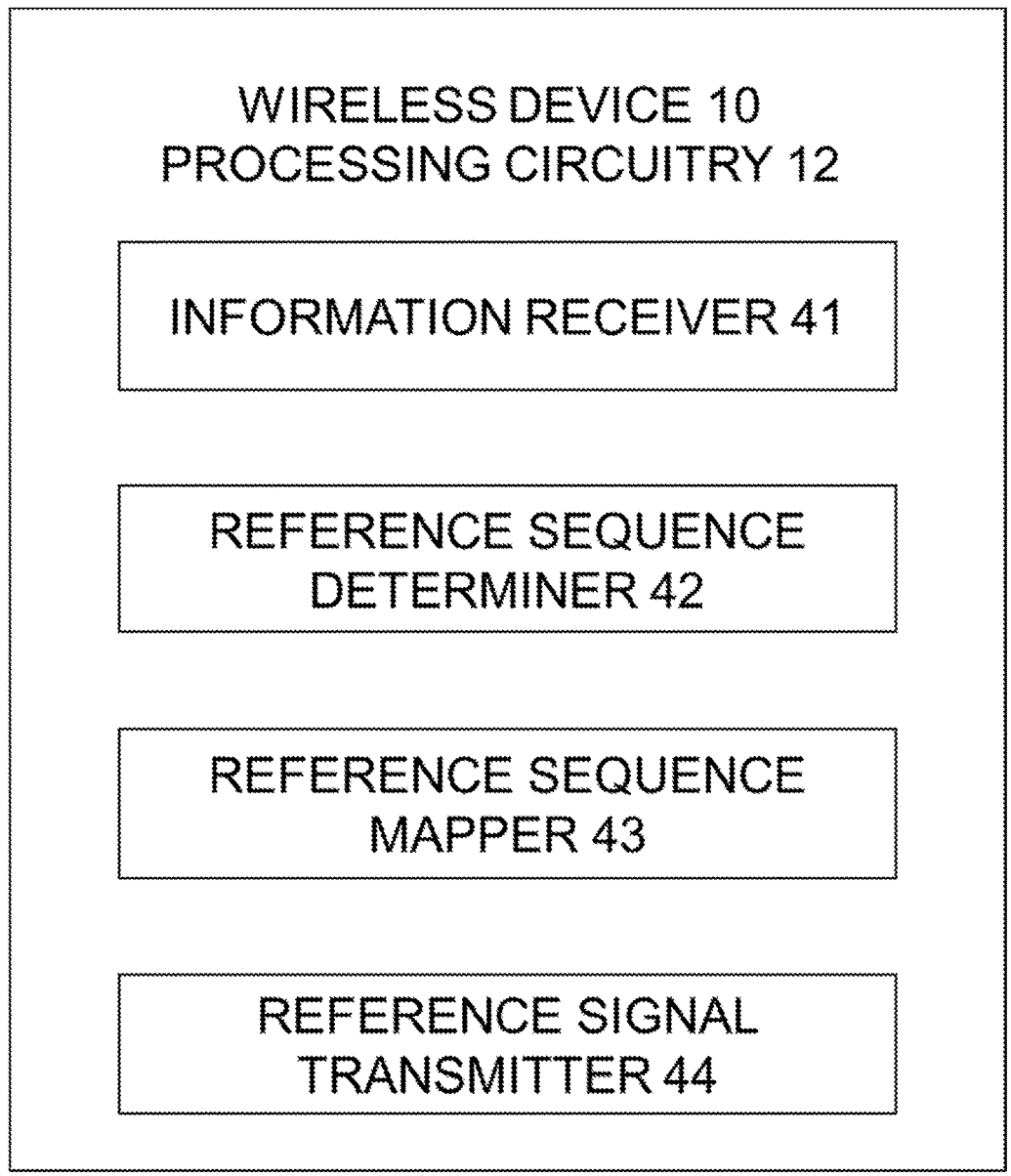
FIG. 10 is an alternative block diagram of a wireless device configured to transmit a reference signal.

According to some aspects the processing circuitry 12 or the wireless device 10 comprises modules 41-44 configured to perform the methods described above. The modules are illustrated in FIG. 10. The modules are implemented in hardware or in software or in a combination thereof. The modules are according to one aspect implemented as a computer program stored in a memory 13 which run on the processing circuitry 12.

According to some aspects the wireless device 10 or the processing circuitry 12 comprises a receiver module 41 configured to receive information indicating a frequency subcarrier spacing, the frequency subcarrier spacing being based at least on the number of scheduled spatially multiplexed wireless devices in the multi carrier system.

According to some aspects the wireless device 10 or the processing circuitry 12 comprises a determiner module 42 configured to determine a sequence of a reference signal based at least on the received information.

According to some aspects the wireless device 10 or the processing circuitry 12 comprises a mapper module 43 configured to map the sequence of the reference signal to resource elements in a reference signal carrying symbol using the received information.

According to some aspects the wireless device 10 or the processing circuitry 12 comprises a transmitter module 44 configured to transmit the reference signal to a network node 20 in resource elements of a reference signal carrying symbol using the received information.

Figure 9:
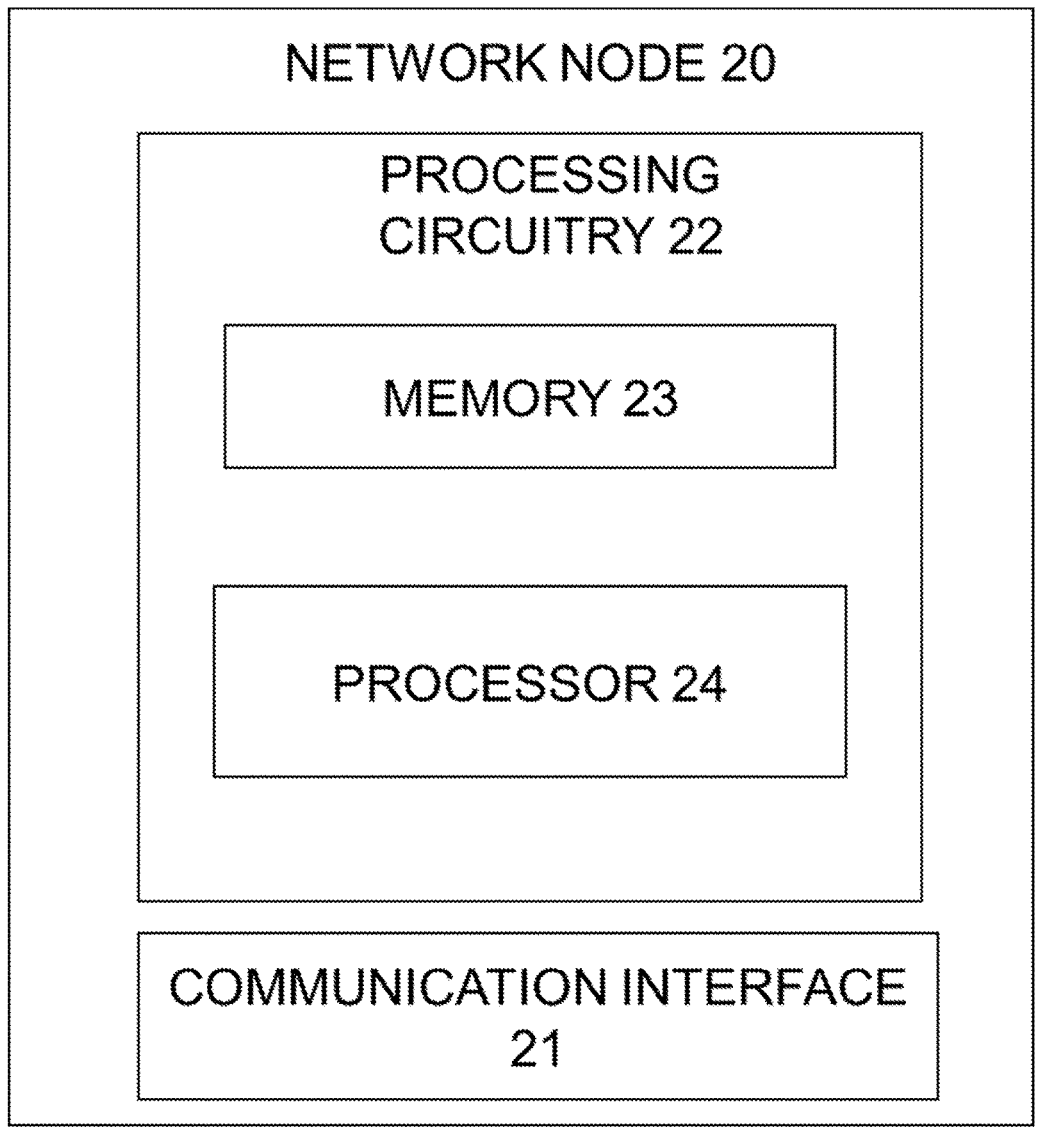
FIG. 9 is a block diagram illustrating a network node configured to receive a reference signal.

FIG. 9 illustrates an example of a network node 20, which incorporates some of the example embodiments discussed above. FIG. 9 discloses a network node 20 being configured for receiving a reference signal from a wireless device 10. As shown in FIG. 9, the network node 20 comprises a radio communication interface or radio circuitry 21 configured to receive and transmit any form of communications or control signals within a network. It should be appreciated that the communication interface (radio circuitry) 21 is according to some aspects comprised as any number of transceiving, receiving, and/or transmitting units or circuitry. It should further be appreciated that the radio circuitry 21 can e.g. be in the form of any input/output communications port known in the art. The radio circuitry 21 e.g. comprises RF circuitry and baseband processing circuitry (not shown).

The network node 20 according to some aspects further comprises at least one memory unit or circuitry 23 that is in communication with the radio circuitry 21. The memory 23 can e.g. be configured to store received or transmitted data and/or executable program instructions. The memory 23 is e.g. configured to store any form of contextual data. The memory 23 can e.g. be any suitable type of computer readable memory and can e.g. be of volatile and/or non-volatile type.

The network node 20 further comprises processing circuitry 22 which configured to cause the network node 20 to obtain information indicating at least one frequency subcarrier spacing, the frequency subcarrier spacing being based on at least the number of scheduled spatially multiplexed wireless devices in the multi carrier system, to transmit the obtained information to a wireless device 10, and to receive a reference signal from the wireless device 10, the reference signal being received in resource elements of a reference signal carrying symbol using the indicated frequency subcarrier spacing.

The processing circuitry 22 is e.g. any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but is according to some aspects provided as any number of units or circuitry. The processing circuitry may thus comprise both a memory 23 for storing a computer program and a processor 24, the processor being configured to carry out the method of the computer program.

The controller, CTL, or processing circuitry 22 is according to some aspects capable of executing computer program code. The computer program is e.g. stored in a memory, MEM, 23. The memory 23 can be any combination of a Read And write Memory, RAM, and a Read Only Memory, ROM. The memory 23 in some situations also comprise persistent storage, which, for example, can be any single one or combination of magnetic memory, optical memory, or solid state memory or even remotely mounted memory. It should be appreciated that the processing circuitry need not be provided as a single unit but is according to some aspects provided as any number of units or circuitry. According to some aspects, the disclosure relates to a computer program comprising computer program code which, when executed, causes a network node to execute the methods described above and below.

According to some aspects, the processing circuitry 22 is configured to receive information from a wireless device 10 indicating one or more of measurement reports, numerologies that the wireless device 10 is able to use and the speed of the wireless device 10, and wherein the obtained information is based at least on the received information.

According to some aspects, the obtained information is at least one numerology and to obtain information indicating at least one frequency subcarrier spacing comprises to determine at least one numerology in the network node 20 or to receive the at least one numerology from another node 30.

According to some aspects, the processing circuitry 22 is configured to use the received reference signal for channel estimation.

According to some aspects, to transmit the obtained information or at least one numerology to the wireless device 10 comprises to transmit by dedicated signaling or broadcasting to the wireless device 10.

According to some aspects, the indicated frequency subcarrier spacing is reduced compared to a preconfigured or baseline frequency subcarrier spacing, or frequency subcarrier spacing of a baseline or preconfigured numerology, in at least one of the at least one indicated frequency subcarrier spacings or numerologies.

According to some aspects, the number of subcarriers is increased while the total subcarrier frequency bandwidth is maintained in the obtained information or at least one numerology compared to a preconfigured or baseline frequency subcarrier spacing, or frequency subcarrier spacing of a preconfigured or baseline numerology.

According to some aspects, several frequency subcarrier spacings or numerologies are used, and the frequency subcarrier spacing is reduced only in reference signal carrying symbols.

According to some aspects, the frequency subcarrier spacing is reduced for all symbols.

According to some aspects, the obtained information or numerology indicates a cyclic prefix (CP), wherein the CP duration is increased while the CP overhead is maintained.

According to some aspects, the preconfigured or baseline frequency subcarrier spacing is 15 kHz and the and the reduced frequency subcarrier spacing is 7.5 kHz.

According to some aspects, the multi carrier system is configured for multi-user multiple-input and multiple-output (MU-MIMO) transmissions.

The wireless device comprises modules (41-44) operative to receive information indicating a frequency subcarrier spacing (module 41), the frequency subcarrier spacing being based at least on the number of scheduled spatially multiplexed wireless devices in the multi carrier system; determine a sequence of a reference signal based at least on the received information (module 42); and transmit the reference signal to a network node in resource elements of a reference signal carrying symbol using the received information (module 44).

The network node comprises modules (51-55) operative to obtain information indicating at least one frequency subcarrier spacing, the frequency subcarrier spacing being based on at least the number of scheduled spatially multiplexed wireless devices in the multi carrier system (module 52); transmit the obtained information to a wireless device (module 53); and receive a reference signal from the wireless device (module 54), the reference signal being received in resource elements of a reference signal carrying symbol using the indicated frequency subcarrier spacing.

Figure 11:
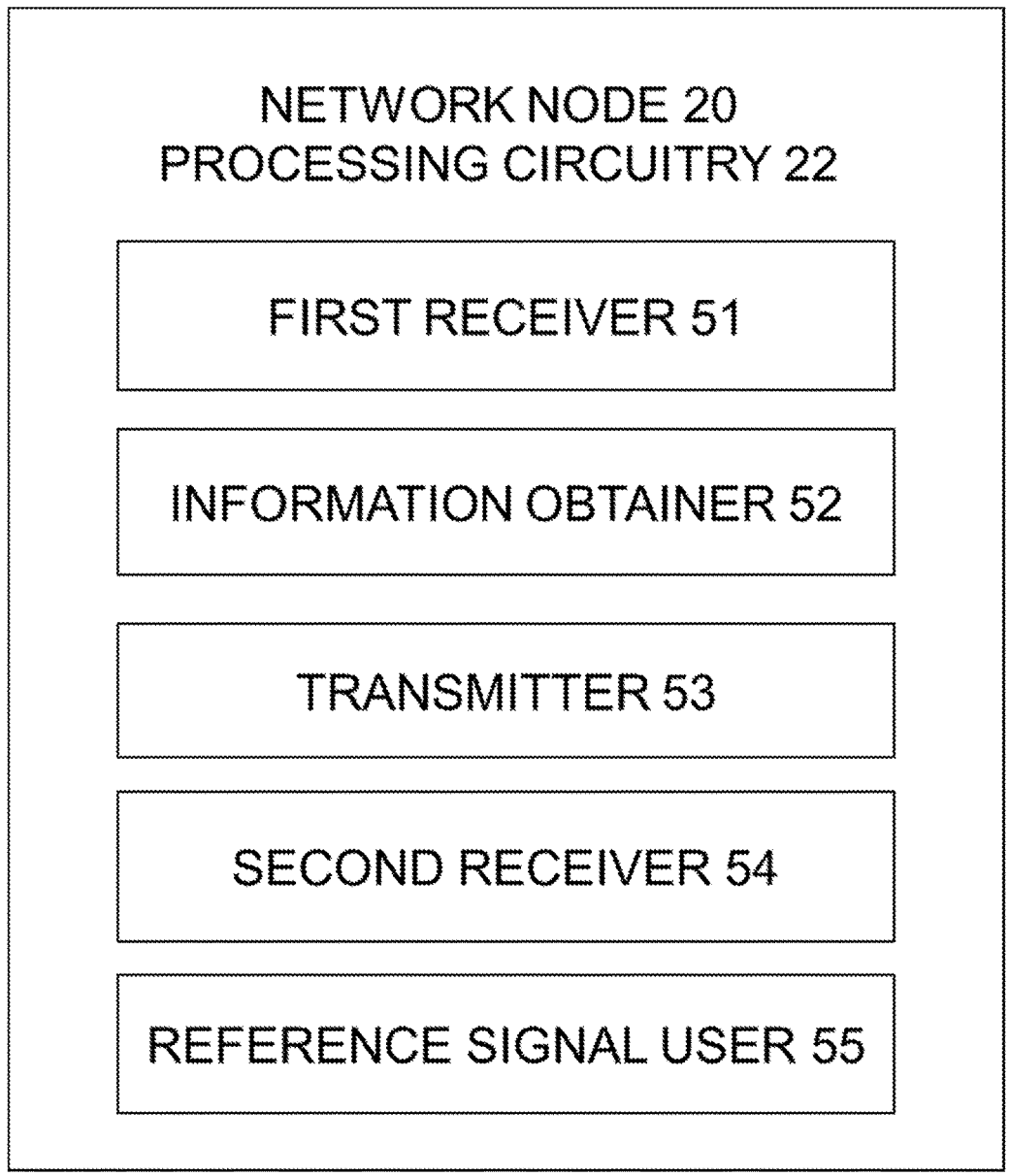
FIG. 11 is an alternative block diagram illustrating a network node configured to receive a reference signal.

According to some aspects the network node 20 or the processing circuitry 22 comprises modules configured to perform the methods described above. The modules are implemented in hardware or in software or in a combination thereof. The modules are illustrated in FIG. 11. The modules are according to one aspect implemented as a computer program stored in a memory 23 which run on the processing circuitry 22.

According to some aspects the network node 20 or the processing circuitry 22 comprises a first receiver module 51 configured to receive information from a wireless device indicating one or more of measurement reports, numerologies that the wireless device is able to use and the speed of the wireless device, and wherein the obtained information is based at least on the received information According to some aspects the network node 20 or the processing circuitry 22 comprises an obtainer module 52 configured to obtain information indicating at least one frequency subcarrier spacing, the frequency subcarrier spacing being based on at least the number of scheduled spatially multiplexed wireless devices in the multi carrier system According to some aspects the network node 20 or the processing circuitry 22 comprises a transmitter module 53 configured to transmit the obtained information to a wireless device.

According to some aspects the network node 20 or the processing circuitry 22 comprises a second receiver module 54 configured to receive a reference signal from the wireless device, the reference signal being received in resource elements of a reference signal carrying symbol using the indicated frequency subcarrier spacing.

According to some aspects the network node 20 or the processing circuitry 22 comprises a user module 55 configured to use the received reference signal for channel estimation.

The content of this disclosure thus enables to adapt the numerology to use within the cell such that it enables the creation of as long reference sequences as needed for the number of simultaneously served MU-MIMO users without increasing the PAPR of reference signals, and also allows a longer cyclic prefix (CP) while keeping the CP overhead on the same level as the baseline configuration.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

According to some aspects is provided a computer program comprising computer program code which, when executed in a wireless device, causes the wireless device to execute the methods in the wireless device described above.

According to some aspects is provided a computer program comprising computer program code which, when executed in a network node, causes the network node to execute the methods in the network node described above.

According to some aspects is provided a carrier containing any one of the computer programs mentioned above, wherein the carrier is one of an electronic signal, optical signal, radio signal, or computer readable storage medium.

ABBREVIATIONS

3GPP Third generation partnership project
5G 5th generation mobile networks or 5th generation wireless systems
AGC Automatic Gain Control
A-MPR Additional Maximum Power Reduction
BS Base Station
BSR Buffer Status Report
BTS Base Transceiver Station
CA Carrier Aggregation
CS Carrier Sensing
CCA Clear Channel Assessment
CSI Channel State Information
CSMA Carrier Sense Multiple Access
DAS Distributed Antenna System
D2D Device to device
DL Downlink
HPN High power network node
LAA Licensed Assisted Access
LEE laptop embedded equipment
LBT Listen before Talk
LTE Long Term Evolution
LPN Low Power Network node MCS Modulation and Coding Scheme
M2M Machine-to-Machine
MPR Maximum Power Reduction
MTC Machine type communication
NW Network
OFDM Orthogonal Frequency Division Multiplexing
0PAPR Peak to Average Power Ratio
PCell Primary cell
PDA Personal digital assistant
PDCCH PHY Downlink Control Channel
PH Power headroom
PHR PH reporting
PHY Physical
PRB PHY resource block
QAM Quadrature Amplitude Modulation
QoS Quality of Service
QPSK Quadrature Phase Shift Keying
RA Resource Allocation
RAN Radio Access Network
RAT Radio Access Technology
RRH Remote Radio Head
RRM Radio Resource Management
RRU Remote radio unit
Scell Secondary cell
SC-FDM Single Carrier Frequency Division Multiplexing
SI Self-Interference
SNR Signal-to-Noise Ratio
SINR Signal to Interference plus Noise Ratio
SR Scheduling Request
TLM Traffic Load Map
TDD Time Division Duplex
TH Threshold
TN Transmission Node
TP Transmission Point
UE User Equipment
UL Uplink
UL-SCHUL shared channel
USB Universal Serial Bus

The invention claimed is:

1. A method for use in a wireless device in a multi-carrier system supporting spatial multiplexing of wireless devices, for transmitting a reference signal to a network node, the method comprising:
receiving information indicating a frequency subcarrier spacing, the frequency subcarrier spacing being based on at least the number of scheduled spatially multiplexed wireless devices in the multi-carrier system;
determining a sequence for transmission as the reference signal, based at least on the received information, including setting a length of the sequence in dependence on the number of scheduled spatially multiplexed wireless devices in the multi-carrier system;
mapping elements of the sequence to resource elements of a reference signal carrying symbol having subcarriers at the frequency subcarrier spacing, wherein the length of the sequence determines the number of frequency subcarriers spanned by the reference signal in the reference signal carrying symbol; and
transmitting the sequence on the mapped resource elements, as said reference signal.

2. The method of claim 1, wherein the received information indicates a numerology, wherein the frequency subcarrier spacing is known from the indicated numerology, and wherein the step of mapping elements of the sequence to resource elements of the reference signal carrying symbol comprises mapping respective elements of the sequence to respective resource elements, across a corresponding set of subcarriers at the frequency subcarrier spacing.

3. The method of claim 1, wherein receiving the information indicating the frequency subcarrier spacing comprises receiving the information from the network node.

4. The method of claim 1, wherein setting the length of the sequence in dependence on the number of scheduled spatially multiplexed wireless devices in the multi-carrier system preserves orthogonality between the reference signal and other reference signals that are determined in like dependence.

5. The method of claim 1, wherein, for the reference signal carrying symbol, an overall number of subcarriers comprised in the reference signal carrying symbol is increased while a corresponding total subcarrier frequency bandwidth is maintained, compared to a preconfigured or baseline configuration.

6. The method of claim 1, wherein the received information indicates, as said frequency subcarrier spacing, a reduced frequency subcarrier spacing that is reduced compared to a baseline or preconfigured frequency subcarrier spacing.

7. The method of claim 6, wherein the reduced frequency subcarrier spacing is used only in reference signal carrying symbols.

8. The method of claim 6, wherein the reduced frequency subcarrier spacing is used in symbols.

9. The method of claim 6, wherein the received information indicates a cyclic prefix (CP), wherein the CP duration is increased while the CP overhead is maintained.

10. The method of claim 6, wherein the baseline or preconfigured frequency subcarrier spacing is 15 kHz and the reduced frequency subcarrier spacing is 7.5 kHz.

11. The method of claim 1, wherein the multi carrier system is configured for multi-user multiple-input and multiple-output (MU-MIMO) transmissions.

12. A method for use in a network node in a multi-carrier system supporting spatial multiplexing of wireless devices, for receiving a reference signal from a wireless device, the method comprising:
obtaining information indicating a frequency subcarrier spacing, the frequency subcarrier spacing being based on at least the number of scheduled spatially multiplexed wireless devices in the multi-carrier system;
transmitting the obtained information to the wireless device;
determining a receiver configuration for receiving a reference signal to be transmitted by the wireless device, including accounting for a length of a sequence transmitted by the wireless device as the reference signal, wherein the wireless device varies the length of the sequence in dependence on the number of scheduled spatially multiplexed wireless devices in the multi-carrier system and maps elements of the sequence to resource elements of a reference signal carrying symbol, the length of the sequence determining the number of subcarriers for transmission of the reference signal; and
receiving the reference signal from the wireless device in the reference signal carrying symbol, according to the determined receiver configuration.

13. The method of claim 12, further comprising:
receiving information from the wireless device indicating one or more of measurement reports, numerologies that the wireless device is able to use, and the speed of the wireless device, and wherein obtaining the information indicating the frequency subcarrier spacing comprises determining it based at least in part on the received information from the wireless device.

14. The method of claim 12, wherein the obtained information is at least one numerology determined by the network node or received from another node, each numerology of the at least one numerology defining a corresponding frequency subcarrier spacing.

15. The method of claim 12, further comprising:
using the received reference signal for channel estimation with respect to the wireless device.

16. The method of claim 12, wherein transmitting the obtained information to the wireless device comprises transmitting by dedicated signaling or broadcasting to the wireless device.

17. The method of claim 12, wherein an overall number of subcarriers comprised in the reference signal carrying symbol is increased while a corresponding total subcarrier frequency bandwidth is maintained, compared to a preconfigured or baseline frequency subcarrier spacing.

18. The method of claim 12, wherein the frequency subcarrier spacing is reduced compared to a preconfigured or baseline frequency subcarrier spacing.

19. The method of claim 18, wherein the frequency subcarrier spacing is a reduced spacing, as among several frequency subcarrier spacings available for use, and the reduced spacing is used only in reference signal carrying symbols.

20. The method of claim 18, wherein the frequency subcarrier spacing is a reduced spacing, as among several frequency subcarrier spacings available for use, and the reduced spacing is used for all symbols.

21. The method of claim 18, wherein the obtained information indicates a cyclic prefix (CP), wherein the CP duration is increased while the CP overhead is maintained.

22. The method of claim 18, wherein the preconfigured or baseline frequency subcarrier spacing is 15 kHz and the reduced frequency subcarrier spacing is 7.5 kHz.

23. The method of claim 12, wherein the multi carrier system is configured for multi-user multiple-input and multiple-output (MU-MIMO) transmissions.

24. A wireless device, configured to operate in a multi-carrier system supporting spatial multiplexing of wireless devices, configured for transmitting a reference signal to a network node, the wireless device comprising:
a communication interface configured for communicating with the network node; and
processing circuitry configured to cause the wireless device to:
receive information indicating a frequency subcarrier spacing, the frequency subcarrier spacing being based at least on the number of scheduled spatially multiplexed wireless devices in the multi-carrier system;
determine a sequence for transmission as the reference signal based at least on the received information, including setting a length of the sequence in dependence on the number of scheduled spatially multiplexed wireless devices in the multi-carrier system;
map elements of the sequence to resource elements of a reference signal carrying symbol having subcarriers at the frequency subcarrier spacing, wherein the length of the sequence determines the number of frequency subcarriers spanned by the reference signal in the reference signal carrying symbol; and
transmit the sequence on the mapped resource elements, as said reference signal.

25. The wireless device of claim 24, wherein the received information indicates a numerology, wherein the frequency subcarrier spacing is known from the indicated numerology, and wherein the step of mapping elements of the sequence to resource elements of the reference signal carrying symbol comprises mapping respective elements of the sequence to respective resource elements, across a corresponding set of subcarriers at the frequency subcarrier spacing.

26. The wireless device of claim 24, wherein the processing circuitry is configured to receive the information indicating the frequency subcarrier spacing by receiving the information from the network node.

27. The wireless device of claim 24, wherein the processing circuitry setting the length of the sequence in dependence on the number of scheduled spatially multiplexed wireless devices in the multi-carrier system preserves orthogonality between the reference signal and other reference signals that are determined in like dependence.

28. The wireless device of claim 24, wherein, for the reference signal carrying symbol, and overall number of subcarriers comprised in the reference signal carrying symbol is increased while a corresponding total subcarrier frequency bandwidth is maintained, compared to a preconfigured or baseline configuration.

29. The wireless device of claim 24, wherein the received information indicates, as said frequency subcarrier spacing, a reduced frequency subcarrier spacing that is reduced compared to a baseline or preconfigured frequency subcarrier spacing.

30. The wireless device of claim 29, wherein the reduced frequency subcarrier spacing is used only in reference signal carrying symbols.

31. The wireless device of claim 29, wherein the reduced frequency subcarrier spacing is used in all symbols.

32. The wireless device of claim 29, wherein the received information indicates a cyclic prefix (CP), wherein the CP duration is increased while the CP overhead is maintained.

33. The wireless device of claim 29, wherein the baseline or preconfigured frequency subcarrier spacing is 15 kHz and the reduced frequency subcarrier spacing is 7.5 kHz.

34. The wireless device of claim 33, wherein the multi carrier system is configured for multi-user multiple-input and multiple-output (MU-MIMO) transmissions.

35. A network node, configured to operate in a multi-carrier system supporting spatial multiplexing of wireless devices, configured for receiving a reference signal from a wireless device, the network node comprising:
a communication interface configured for communicating with the wireless device; and
processing circuitry configured to cause the network node to:
obtain information indicating a frequency subcarrier spacing, the frequency subcarrier spacing being based on at least the number of scheduled spatially multiplexed wireless devices in the multi-carrier system;
transmit the obtained information to the wireless device;
determine a receiver configuration for receiving a reference signal to be transmitted by the wireless device, including accounting for a length of a sequence transmitted by the wireless device as the reference signal, wherein the wireless device varies the length of the sequence in dependence on the number of scheduled spatially multiplexed wireless devices in the multi-carrier system and maps elements of the sequence to resource elements of a reference signal carrying symbol, the length of the sequence determining the number of subcarriers for transmission of the reference signal; and receive the reference signal from the wireless device in the reference signal carrying symbol, according to the determined receiver configuration.

36. The network node of claim 35, wherein the processing circuitry is configured to:

receive information from the wireless device indicating one or more of measurement reports, numerologies that the wireless device is able to use, and the speed of the wireless device, and wherein the processing circuitry is configured to obtain the information indicating the frequency subcarrier spacing by determining it based at least in part on the received information from the wireless device.

37. The network node of claim 35, wherein the obtained information is at least one numerology determined by the processing circuitry or received from another node, each numerology of the at least one numerology defining a corresponding frequency subcarrier spacing.

38. The network node of claim 35, wherein the processing circuitry is configured to:

use the received reference signal for channel estimation with respect to the wireless device.

39. The network node of claim 35, wherein the processing circuitry is configured to transmit the obtained information to the wireless device by dedicated signaling or broadcasting to the wireless device.

40. The network node of claim 35, wherein an overall number of subcarriers comprised in the reference signal carrying symbol is increased while a corresponding total subcarrier frequency bandwidth is maintained, compared to a preconfigured or baseline frequency subcarrier spacing.

41. The network node of claim 35, wherein the frequency subcarrier spacing is a reduced frequency subcarrier spacing, as compared to a preconfigured or baseline frequency subcarrier spacing.

42. The network node of claim 41, wherein the reduced frequency subcarrier spacing is used only in reference signal carrying symbols.

43. The network node of claim 41, wherein the reduced frequency subcarrier spacing is used in all symbols.

44. The network node of claim 41, wherein the obtained information indicates a cyclic prefix (CP), wherein the CP duration is increased while the CP overhead is maintained.

45. The network node of claim 41, wherein the preconfigured or baseline frequency subcarrier spacing is 15 kHz and the reduced frequency subcarrier spacing is 7.5 kHz.

46. The network node of claim 35, wherein the multi carrier system is configured for multi-user multiple-input and multiple-output (MU-MIMO) transmissions.

47. A non-transitory computer readable storage medium storing a computer program for transmitting a reference signal to a network node, the computer program comprising computer program code that, when executed in processing circuitry of a wireless device in a multi-carrier system supporting spatial multiplexing of wireless devices, causes the wireless device to:

receive information indicating a frequency subcarrier spacing, the frequency subcarrier spacing being based on at least the number of scheduled spatially multiplexed wireless devices in the multi-carrier system;

determine a sequence for transmission as the reference signal based at least on the received information, including setting a length of the sequence in dependence on the number of scheduled spatially multiplexed wireless devices in the multi-carrier system;

map elements of the sequence to resource elements of a reference signal carrying symbol having subcarriers at the frequency subcarrier spacing, wherein the length of the sequence determines the number of frequency subcarriers spanned by the reference signal in the reference signal carrying symbol; and transmit the sequence on the mapped resource elements, as said reference signal.

48. A non-transitory computer readable storage medium storing a computer program for receiving a reference signal from a wireless device, the computer program comprising computer program code that, when executed in processing circuitry of a network node in a multi-carrier system supporting spatial multiplexing of wireless devices, causes the network node to:

obtain information indicating a frequency subcarrier spacing, the frequency subcarrier spacing being based on at least the number of scheduled spatially multiplexed wireless devices in the multi-carrier system;

transmit the obtained information to the wireless device;

determine a receiver configuration for receiving a reference signal to be transmitted by the wireless device, including accounting for a length of a sequence transmitted by the wireless device as the reference signal, wherein the wireless device varies the length of the sequence in dependence on the number of scheduled spatially multiplexed wireless devices in the multi-carrier system and maps elements of the sequence to resource elements of a reference signal carrying symbol, the length of the sequence determining the number of subcarriers for transmission of the reference signal; and receive the reference signal from the wireless device in the reference signal carrying signal, according to the determined receiver configuration.

* * * * *